United States Patent [19]

Thompson

[11] 4,218,101
[45] Aug. 19, 1980

[54] LOW DISTURBANCE TRACK CLEAT AND ICE CALK STRUCTURE FOR FIRM OR ICY SNOW

[75] Inventor: James A. Thompson, Logan, Utah

[73] Assignee: De Lorean Manufacturing Company, Bloomfield Hills, Mich.

[21] Appl. No.: 892,710

[22] Filed: Apr. 3, 1978

[51] Int. Cl.² ............... B62D 55/24; B62D 55/28
[52] U.S. Cl. ....................... 305/35 EB; 305/54
[58] Field of Search ............ 305/35 EB, 54, 38; 152/229, 226, 230; 85/8.8

[56] References Cited

U.S. PATENT DOCUMENTS

| | | | |
|---|---|---|---|
| 3,519,309 | 7/1970 | Engle et al. | 85/8.8 X |
| 3,715,146 | 2/1973 | Robertson | 305/35 EB |
| 3,829,174 | 8/1974 | Thomas | 305/35 EB |
| 3,838,894 | 10/1974 | Reedy | 305/35 EB |
| 3,883,190 | 5/1975 | Kilbane | 305/35 EB |
| 3,930,689 | 1/1976 | Maki | 305/35 EB |

Primary Examiner—David A. Scherbel
Attorney, Agent, or Firm—A. Ray Osburn

[57] ABSTRACT

An endless crawler track for a tracked vehicle, having particular utility in applications where snow to be traversed by the vehicle is hard or icy, includes low disturbance track cleats that are spaced three to five inches apart and are bolted crosswise to the belting of the track. The cleats are characterized by having a generally triangular oval cross section so that as the belting travels upward fron the rear wheel around the drive sprocket at the rear of the vehicle, each cleat emerges from the imprint made in the snow without chunking and flinging of snow. The track features a novel ice calk attached to every third or fourth track cleat for preventing sideways sliding of the vehicle on ice.

10 Claims, 6 Drawing Figures ically shown in U.S. Pat. No.
3,165,364, granted on Jan. 12, 1965. The track cleat
elements there disclosed have provided a smooth-riding
self-cleaning endless track that has been further characterized by the inclusion of provisions for concentrating
wear on a central replaceable wear plate during operation on hard road and ground surfaces, and for the
attachment of an extended traction device for use in
deep snow.

A problem with the prior art track cleat elements,
particularly when the track-lying vehicle is used on firm
or icy snow, is their tendency upon egress from the
imprint made in the snow, to chunking and flinging of
sections of snow thereby undesirably disturbing the
snow, and their further tendency to sideways slipping
on ice.

SUMMARY OF THE INVENTION

Among the objects of the invention is the provision of
a low-disturbance track cleat and ice calk structure for
the endless tracks of over-snow work vehicles that is
particularly useful on firm or icy snow and that avoids
the abovementioned problems of the prior art.

Another object of the invention is the provision of an
improved structure for supporting a replaceable ice calk
for a vehicle crawler track, which structure includes a
sleeve means that releasably supports the ice calk with
respect to the track.

A further object of the invention is the provision of
an improved crawler track for work vehicles having
particular utility on firm or icy snow that includes first
and second sets of track cleat elements, alternate ones of
said first and second sets of track cleat elements being
laterally disposed with respect to each other on said
track, and further includes a plurality of ice calks that
are attached to selected ones of each of said first and
second sets of track cleat elements to minimize sideways
slipping of the track on ice.

In accomplishing these and other objects there is
provided according to the invention an endless crawler
track for over-snow track-laying vehicles having particular utility where snow to be traversed by the vehicle is
firm or icy. The endless crawler track includes elongated low disturbance track cleat elements that are
spaced three to five inches apart and bolted crosswise to
the belting of the track, alternate cleats being laterally
displaced from each other on the belting. Each such
track cleat is characterized by having a generally trianguled oval cross section shape except for a small triangulated area behind a biting edge of the cleat. With
track cleat elements so formed, as the belting travels
upward from the rear wheel and around the drive
sprocket at the rear of the vehicle, the track cleat elements egress from the imprint made in the snow without
chunking and flinging sections of snow. The biting edge
of the cleat provides good traction under hard snow or
icy conditions. In order to prevent sliding of the track
sideways on ice, an ice calk is attached to every third or
fourth cleat, the ice calks desirably being distributed on
opposite sides of the track. Each ice calk is held in a
sleeve or socket which is welded to an associated cleat
element, being releasably retained in the sleeve by a "C"
ring that is provided to facilitate replacement of the ice
calk when worn. For improved wear, each ice calk
desirably is equipped with a tungsten carbide tip.

Brief Description of the Drawings

A better understanding of the present invention may
be had from the following detailed description when
read in connection with the accompanying drawings
wherein.

Figure 1:
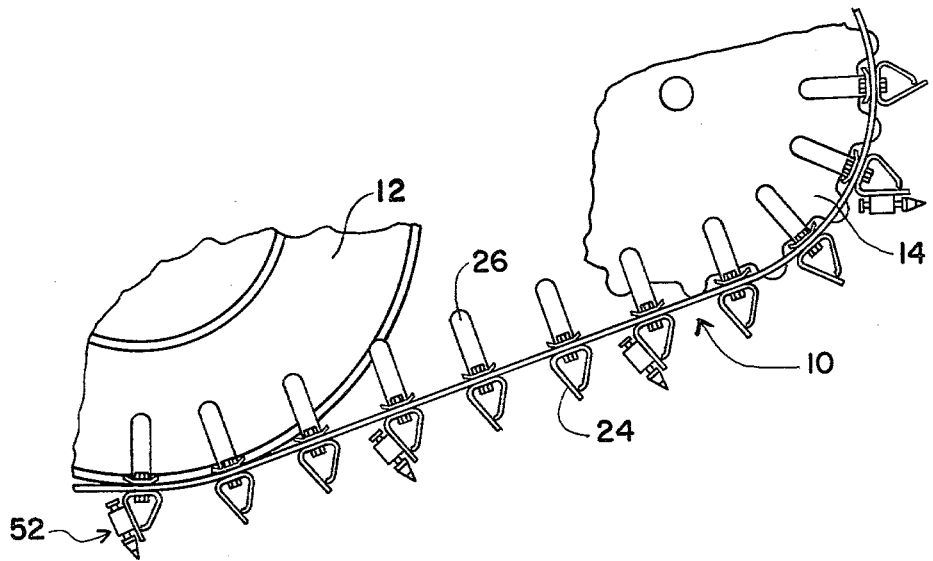
FIG. 1 is a fragmentary side view of an endless track
for a track-layer vehicle, according to the invention, in
meshing engagement with a driving sprocket and with a
guiding tired wheel, and illustrating the low disturbance
cleats and ice calk structure secured thereto.

The novel features of the track cleat element and ice
calk structure of the present invention are illustrated in
the accompanying drawings in combination with the
belting of a crawler or endless belt track, generally
designated 10, of a track-lying vehicle, not shown, but
which is provided with aligned ground or track engaging tired wheels, one of which is shown at 12 in FIG. 1,
and wherein the track is driven from a powered
sprocket wheel such as the wheel 14. It will be understood that the track-laying vehicle is provided with two
endless belt tracks 10, one disposed on either side of the
vehicle. The belting may be made of any suitable material in accordance with conventional practice in the art
such, for example, as rubber, steel or fabric reinforced,
neoprene, etc.

Figure 2:
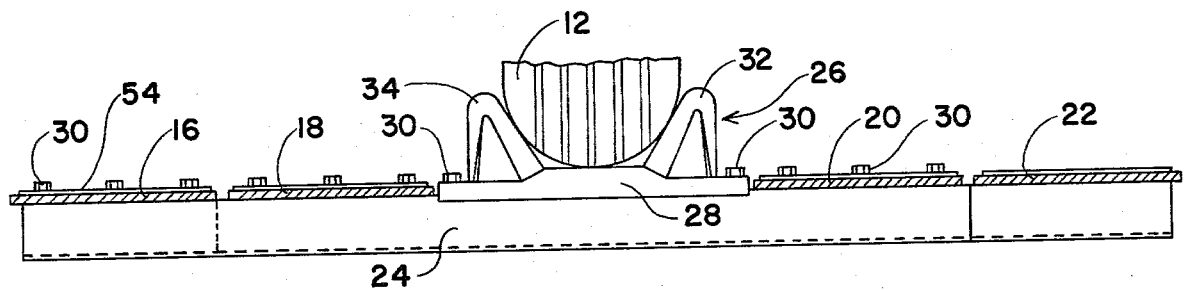
FIG. 2 is a transverse cross section of the endless
track and of the guiding wheel of FIG. 1 taken along
the lines 2—2 of FIG. 3.
Figure 3:
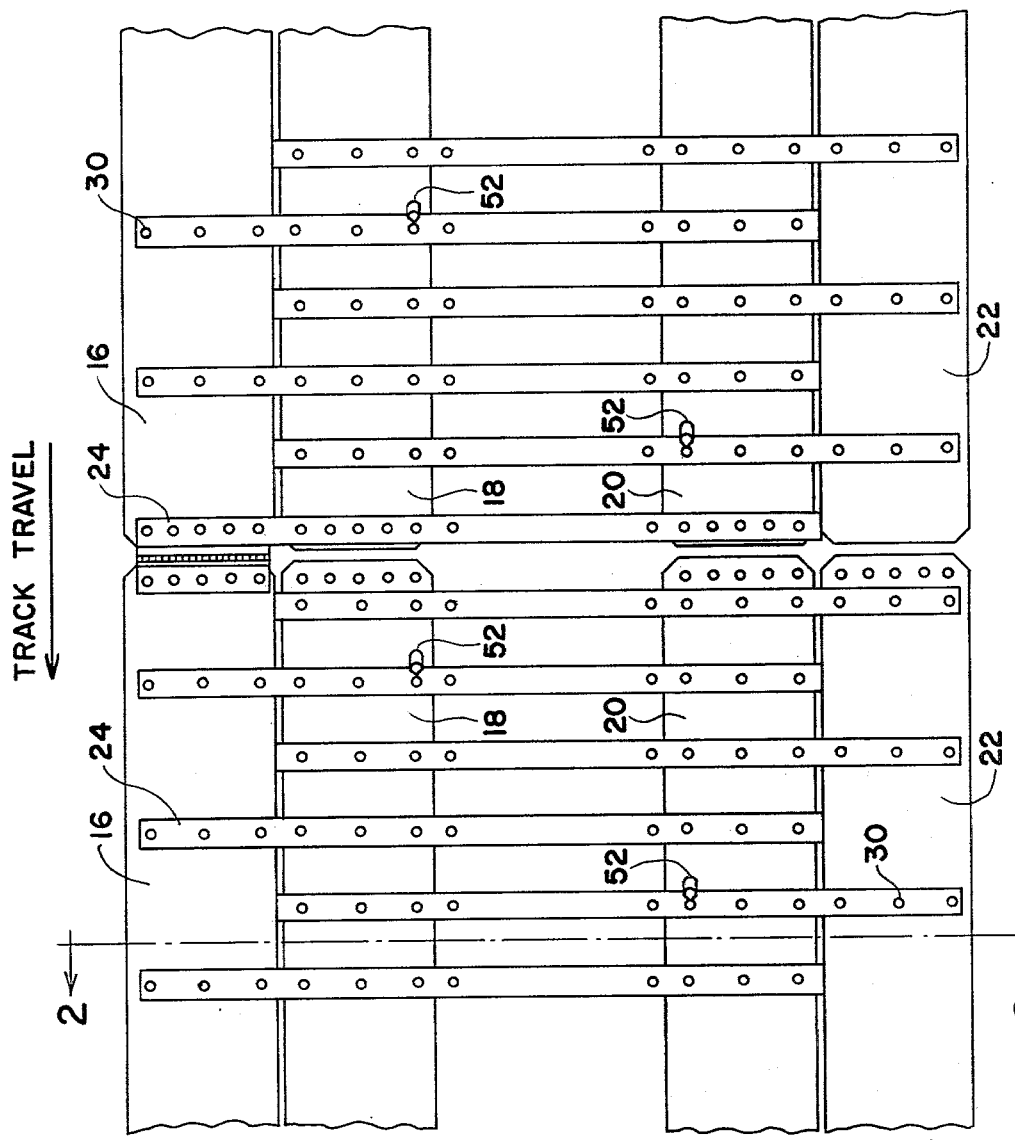
FIG. 3 is a partial plan view of the endless track
illustrating the bolting of the traction cleats to the belting of the track and the location of the ice calks along
the track, wheel guides being omitted.

As is shown in FIGS. 2 and 3, each endless track 10
comprises two pairs of identical endless flexible belts
indicated at 16 and 18, 20 and 22, the belts of each pair
being in closely spaced relation. The pairs of belts 16
and 18, 20 and 22 are arranged in side by side, spaced
relationship, one pair of belts on each side of the front-to-rear aligned row of tired wheels 12. The pairs of belts
are interconnected by a plurality of elongated steel
track cleat elements 24. As seen in FIG. 3, particularly,
the length of each track cleat element 24 is shorter than
the span of the entire width of the two pairs of belts 16
and 18, 20 and 22 by the width of one of the outer belts 16 or 22. The cleat elements 24 are distributed in evenly spaced, staggered relation, along the endless belts 16 and 18, 20 and 22 being suitable attached thereto by a plurality of self locking cap screws as illustrated and described further hereinafter by reference to FIG. 5. The spacing of the cleat elements 24 desirably is at intervals of 3 inches or 5 inches, for example, such that the cleat elements 24 generally coincide and register with the powered sprocket wheel 14 and other conventional idler sprocket wheels that may be provided on track-laying vehicle.

Each track cleat element 24, as illustrated in FIG. 2, comprises several components including a wheel guiding member 26 for tired wheel 12, which member 26 is attached to the cleat element 24. Each member 26 is formed of a central sprocket engaging channel section 28 that is attached to the adjacent inner surface of the cleat 24, being wrapped around the opposite side surfaces thereof for a short distance. The length of the section 28 is such as substantially to span the distance between the belts 18 and 20 of the pairs of belts. Section 28 is held to the cleat element 24 by self locking cap screws indicated at 30.

Each tired wheel guiding member 26 further includes a pair of opposed tired wheel guiding portions 32 and 34 that are formed from a length of channel section into a generally inverted V-shaped configuration with the extended ends of the legs thereof being welded to the central portion 28.

Figure 4:
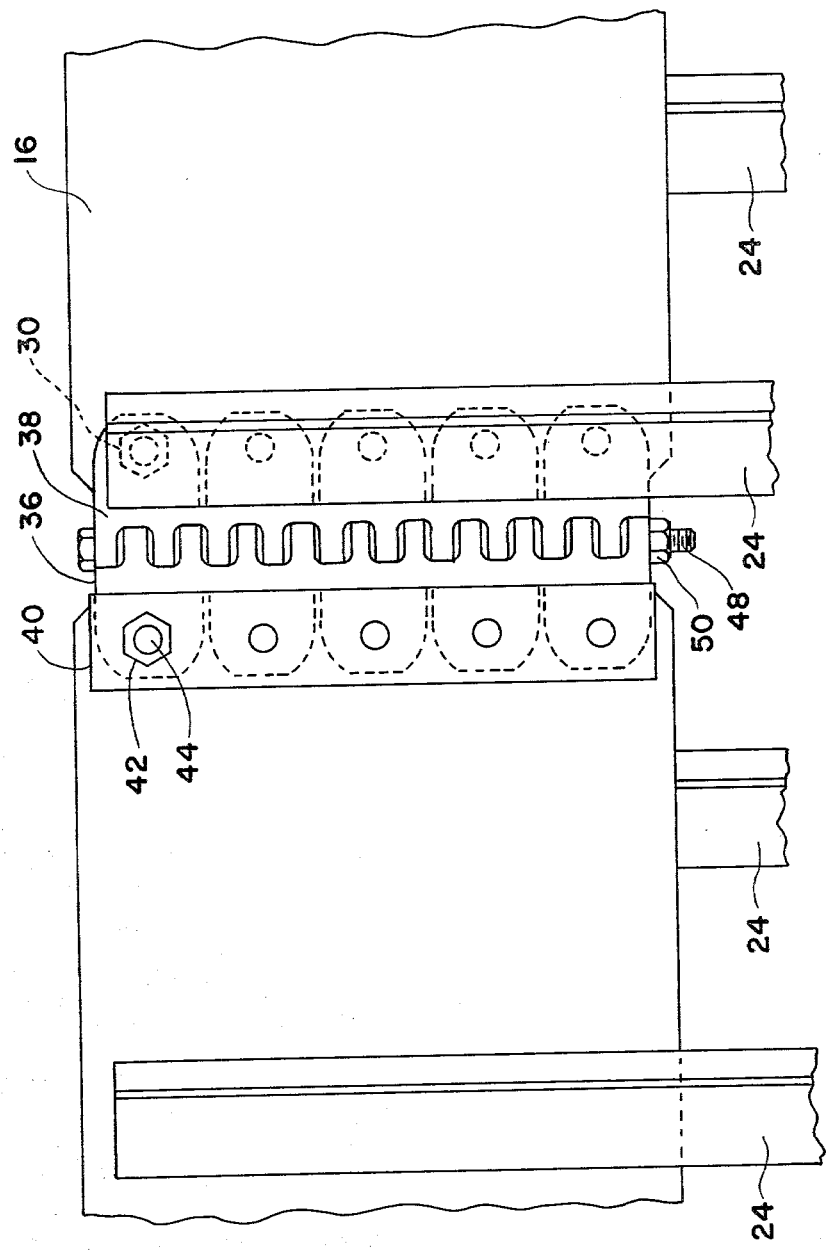
FIG. 4 is a partial plan view of one of the belts of the
endless track illustrating the lacing of the ends of each
belt together.

The manner in which the adjacent ends of the endless belts 16 and 18, 20 and 22 are attached or coupled to each other is illustrated in FIG. 4. FIG. 4 shows the manner of attachment of the ends of a single belt, the belt 16 being selected for purposes of illustration. As there is shown, belt lacings 36 and 38 are attached to the left and right ends, respectively, of the belt 16. Specifically, the left end of belt 16 is clamped between the belt lacing 36 and a lacing back plate 40 by five hex head cap screws 44 and associated nuts 42, only one of each being shown in FIG. 4. Similarly, the right end of belt 16 is clamped between the belt lacing 38 and the adjacent cleat element 24 by a plurality of self locking cap screws such as that indicated at 30 by dotted lines in FIG. 4 but illustrated in detail in FIG. 5. The belt lacings 36 and 38 are brought into cooperate coupling relation and an elongated hex head cap screw or bolt 48 is inserted in the aligned openings to effect the desired coupling, the screw 48 being retained in position by a nut 50.

The attachment or coupling of the ends of the other belts 18, 20 and 22 to each other may be effected in a similar manner. As previously noted, the track cleat elements 24 do not extend across the full width of the track. Thus, in FIG. 3 the cleat element 24 referred to in connection with FIG. 4 is seen to terminate short of the belt 22. Accordingly, a lacing back plate similar to the plate 40 is employed in association with a belt lacing 38 to clamp the right end of the belt 22 therebetween for coupling the ends of the belt 22 together, the left end of the belt being clamped between a belt lacing 36 and lacing back plate 40 as described in connection with FIG. 4.

As seen in FIG. 3 alternate ones of the track cleat elements 24, for convenience designated first track cleat elements, are attached to the belts 16, 18 and 20 and the remainder of the cleat elements, designated second track cleat elements, are attached to the belts 18, 20 and 22. This staggered relation of the first and second track cleat elements 24 on the belting provides a desired flexibility to the outer belts 16 and 22 and also provides a desired strength and stability to the inner belts 18 and 20 which are closer in position to the track engaging wheels 12 and sprocket wheel 14.

In accordance with the invention there is attached to every third or fourth traction cleat element 24 an ice calk assembly 52 for preventing the endless track 10 from slipping sideways on ice, the ice calk assembly being shown in FIG. 3 as attached to alternate ones of each of the first and second track cleat elements and positioned, respectively, adjacent the belts 18 and 20. The ice calk assembly 52 and the structure of the track cleat elements 24 together with the manner of attachment thereof to each other and to the endless belt track 10 are described by reference to FIG. 5, which shows a cross section of a track cleat element 24 attached to the belt 18, the direction of vehicle travel being indicated by the arrow.

Figure 5:
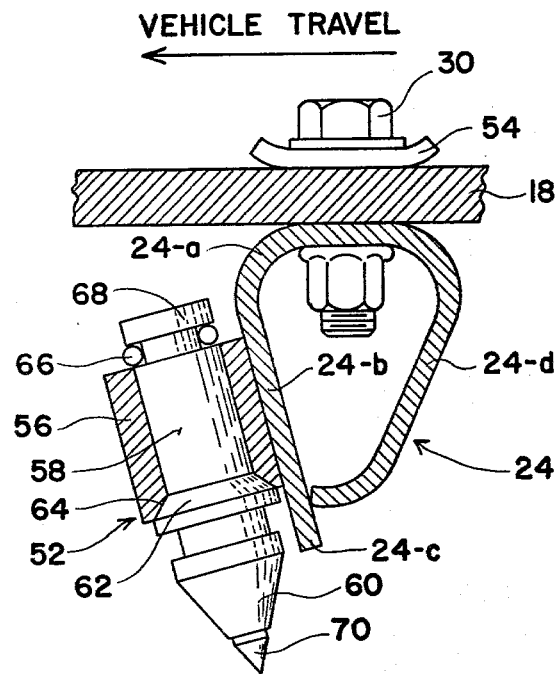
FIG. 5 shows a cross section of the traction cleat and
ice calk structure according to the invention.
Figure 6:
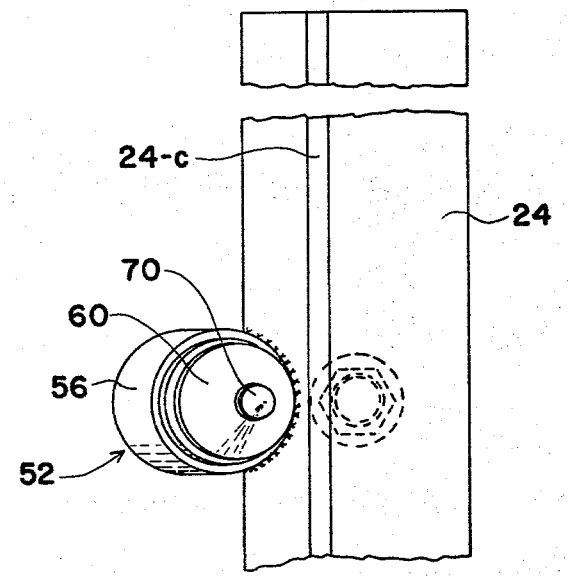
FIG. 6 is a fragmentary bottom plan view of the
traction cleat and ice calk structure.

The cross section of each track cleat element 24, as shown in FIG. 5, is an inverted generally triangulated oval, the cleat element being formed from a suitable steel plate. Each track cleat element in cross section includes a base portion 24-*a*, a leading portion 24-*b* including a biting edge 24-*c* and a trailing side 24-*d*. The attachment of the track cleat element to the belt 18 is by means of a self locking cap screw 30 and a backing plate 54, the belt 18 being clamped between the plate 54 and the element 24. The biting edge 24-*c* is provided by curling the edge of the trailing portion 24-*d* toward the leading portion 24-*a*. With this shape of each of the track cleat elements 24, as the endless belt track 10 travels upward from the rear wheel and around the drive sprocket at the rear of the track-laying vehicle, it will egress from the imprint made in the snow without chunking and flinging sections of snow. The biting edge 24-*c* is desirable for good traction under hard snow or icy conditions.

Each ice calk assembly 52 includes a sleeve or socket 56 and an ice calk 58 formed of hardened steel. The sleeve 56 is welded to the leading portion 24-*b* of the track cleat element 24, being positioned transversely thereto. The ice calk 58 is cylindrically shaped and is provided with a cone shaped pointed end 60, being inserted in the sleeve 56 with the pointed end 60 facing the same direction but extending beyond the end of the biting edge 24-*c* of the cleat element 24. The ice calk 58 is retained in the sleeve 56 by an enlarged beveled edge 62 of the ice calk 58, which edge mates with a beveled edge 64 formed in the associated end of the sleeve 56, and by a removable "C" ring 66 that engages a groove 68 adjacent the end of the ice calk 56 remote from the pointed end 60. As a result, a worn ice calk 56 may readily be removed by removing the "C" ring, and quickly replaced. For improved wear, each ice calk 58 desirably is equipped with a tungsten carbide tip indicated at 70.

Thus, there has been provided according to the present invention an endless crawler track for over-snow track-laying vehicles that is particularly useful where snow to be traversed by the vehicle is hard or icy and where a minimum disturbance to the snow is desired. The invention features a track cleat element and ice calk structure that provides satisfactory traction while at the same time minimizing chunking or flinging of sections of snow and preventing slipping on ice.

What is claimed is:

1. A track cleat and ice calk structure for a vehicle crawler track, including an elongated track cleat adapted to be fixedly attached to, and to extend transversely of, a vehicle crawler track; sleeve means fixedly attached to said track cleat for supporting an ice calk in fixed relation with respect to the vehicle crawler track; an ice calk supported in said sleeve means; and means including a "C" ring to retain said ice calk in said sleeve means, whereby said ice calk is removable and replaceable, said ice calk including a tungsten carbide tip; said track cleat comprising a plate member that is formed to provide a generally triangulated oval cross section, and said sleeve means being transversely disposed with respect to said track cleat, said ice calk being secured in said sleeve means with said tungsten carbide tip protruding therefrom and away from said cleat and from the vehicle crawler track when said structure is installed on a vehicle crawler track.

2. A vehicle crawler track including first and second pairs of parallel endless belts positioned side by side, a plurality of first elongated track cleat elements disposed in mutually spaced relationship transversely of said endless belts and fixedly attached to each belt of said first pair of endless belts and to the adjacent belt of said second pair of endless belts, a plurality of second elongated track cleat elements disposed in mutually spaced relationship transversely of said endless belts and rigidly secured to each belt of said second pair of endless belts and to the adjacent belt of said first pair of belts, said second track cleat elements alternating with said first track cleat elements, a plurality of ice calks each attached to an associated selected one of each of said first and second track cleat elements to prevent sideways sliding of said crawler track on ice, each of said ice calks being in juxtaposition to a respective intermediate one of the belts that is associated with said selected ones of said first and second elongated track cleat elements and wheel guide means disposed between and supported by said first and second pairs of endless belts; and said first and second track cleat elements each being formed of a single elongated plate member formed to provide a generally triangulated oval cross section and having base, leading and trailing portions, and each of said ice calks being held to the associated selected one of said first and second track cleat elements by a sleeve that is transversely attached to a leading portion thereof.

3. A vehicle crawler track as specified in claim 2 further including means associated with the base portion of each of said members for the attachment of said cleats to the crawler track.

4. A vehicle crawler track as specified in claim 3 wherein each of the leading and trailing portions of said members includes an edge, the edge of the trailing portion of each of said members being curled toward the leading portion thereof whereby the edge of said leading portion extends further from the base portion of said member than the edge of the trailing portion thereof.

5. A vehicle crawler track as specified in claim 4 wherein an ice calk is fixedly attached to selected first and second track cleat elements, said ice calks being alternately associated with said first and second track cleat elements and spaced at generally equal intervals along the belts, the ice calks associated with each of said first track cleat elements being positioned on one side of the crawler track and the ice calks associated with each of said second track cleat elements being positioned on the other side of the crawler track.

6. A combination cleat and ice calk for a vehicle crawler track comprising
 an elongated plate member formed to provide an elongated generally triangulated oval cross section and having base, leading and trailing portions, a sleeve transversely attached to the leading portion of said member at a position along the length thereof, and
 an ice calk retained in said sleeve.

7. A combination as specified in claim 6 wherein said plate member includes means associated with the base thereof for the attachment of said member to the vehicle crawler track.

8. A combination as specified in claim 7 wherein said leading and trailing portions of said plate member both include an edge, the edge of the trailing portion of said plate member being curled toward the leading portion thereof whereby the edge of said leading portion extends further from the base portion of said plate member than the edge of the trailing portion thereof.

9. A combination as specified in claim 8 wherein said ice calk is retained in said sleeve by a readily removable "C" ring for facilitating removal and replacement of said ice calk.

10. A combination as specified in claim 9 wherein said ice calk includes a tungsten carbide tip.

* * * * *